United States Patent [19]

Page

[11] 4,249,515
[45] Feb. 10, 1981

[54] HEATING APPARATUS

[76] Inventor: Victor J. Page, Hunter's Lodge, 47 Westmeston Ave., Saltdean, Sussex, England

[21] Appl. No.: 932,943

[22] Filed: Aug. 11, 1978

[30] Foreign Application Priority Data

Aug. 12, 1977 [GB] United Kingdom ............ 34050/77

[51] Int. Cl.³ .............................................. F24J 3/02
[52] U.S. Cl. ................... 126/438; 126/417; 126/432; 126/424; 202/234
[58] Field of Search .............. 126/270, 271, 424, 438, 126/439, 440, 442, 446, 449, 417, 432; 350/310, 288; 202/234

[56] References Cited

U.S. PATENT DOCUMENTS

| 761,596 | 5/1904 | Moss | 126/271 |
|---|---|---|---|
| 3,134,906 | 5/1964 | Henker | 126/270 X |
| 3,254,644 | 6/1966 | Thannhauser | 126/271 |
| 3,488,110 | 1/1970 | Evoy | 350/310 X |
| 3,985,119 | 10/1976 | Oakes, Jr. | 126/271 |
| 3,988,166 | 10/1976 | Beam | 126/271 |
| 4,007,729 | 2/1977 | Chao et al. | 126/439 |

FOREIGN PATENT DOCUMENTS

233573 5/1925 United Kingdom.
1501084 2/1978 United Kingdom.

Primary Examiner—James C. Yeung
Assistant Examiner—Larry Jones
Attorney, Agent, or Firm—Stevens, Davis, Miller & Mosher

[57] ABSTRACT

A solar energy heating apparatus comprising means for concentrating solar energy incident thereon at an absorption station, an absorber located at the said absorption station for absorbing solar energy concentrated thereat, a first passageway associated with the said energy concentrating means for directing fluid so as to be preheated by the proportion of the incident energy absorbed by the said means, a second passageway associated with the absorber for effecting principal heating of fluid directed therethrough, the second passageway being such that on directing fluid through the first passageway it is initially preheated by the proportion of the incident energy absorbed by the said energy concentrating means, the preheated fluid thereafter being directed to the second passageway where the principal heating takes place.

5 Claims, 5 Drawing Figures

HEATING APPARATUS

This invention relates to heating apparatus and, more particularly, to solar energy heating apparatus.

It has been proposed to use solar energy for heating liquid in which the energy is directed to an absorber for circulating the liquid therein.

A disadvantage of existing proposals is that a proportion of solar energy received by apparatus for concentrating solar energy at an absorber is absorbed by the apparatus and the energy is thus dissipated.

According to the present invention there is provided a solar energy heating apparatus comprising means for concentrating solar energy incident thereon at an absorption station, an absorber located at the said absorption station for absorbing solar energy concentrated thereat, a first passageway associated with the said energy concentrating means for directing fluid so as to be preheated by the proportion of the incident energy absorbed by the said means, a second passageway associated with the absorber for effecting principal heating of fluid directed therethrough, the second passageway being in communication with the first passageway, the arrangement being such that on directing fluid through the first passageway it is initially preheated by the proportion of the incident energy absorbed by the said energy concentrating means, the preheated fluid thereafter being directed to the second passageway where the principal heating takes place.

The said energy concentrating means may include a surface for exposure to the said incident energy and the first passageway may be associated with the said energy concentrating means so that fluid directed therethrough is circulated behind substantially the whole of the said surface whereby the fluid is initially preheated by the proportion of the incident energy absorbed by the said surface.

The said surface of the said energy concentrating means may be a curved reflecting surface for concentrating solar energy incident thereon at the absorption station. The curved reflecting surface may be paraboloidal.

The absorber may have an outer surface for exposure to energy directed thereto by the said energy concentrating means, the said outer surface having a plurality of raised portions. The absorber may have an inner recessed surface for receiving solar energy directly from the sun and the said inner surface may have a plurality of raised portions. The outer and inner surfaces of the absorber may be corrugated. The outer and inner surfaces of the absorber may be made of black synthetic material such as rubber.

The absorber may comprise a tube wound to form a helix, the tube defining the second passageway. The helix may be arranged such that adjacent portions of turns thereof are in contact one with another. The tube may be made of black synthetic material such as rubber.

The absorber may be contained within a space bound by the said surface of the said energy concentrating means and enclosed by a plate for transmitting solar energy therethrough to the said energy concentrating means and to the absorber.

The heating apparatus may include means for moving the apparatus and means for controlling movement of the apparatus so that the apparatus may be moved to track the sun.

The first passageway may be adapted to be connected to means for supplying impure liquid and the second passageway may be adapted to be connected to a condenser so that the liquid on being directed through the first passageway is initially preheated and thereafter on being directed through the second passageway is vaporized therein thereby depositing distillation residue in the second passageway and the vapour may be delivered from the second passageway to the condenser wherein the vapour is condensed to purify the liquid.

The second passageway may include an evaporator for vaporizing the liquid and the evaporator may be provided with an outlet for removing distillation residue therefrom and agitating means located therein so that operation of the agitating means assists removal of the concentrated impurities and assists heat distribution within the evaporator.

Following is a description by way of example only and with reference to the accompanying drawings of one method of carrying the invention into effect.

Figure 1:
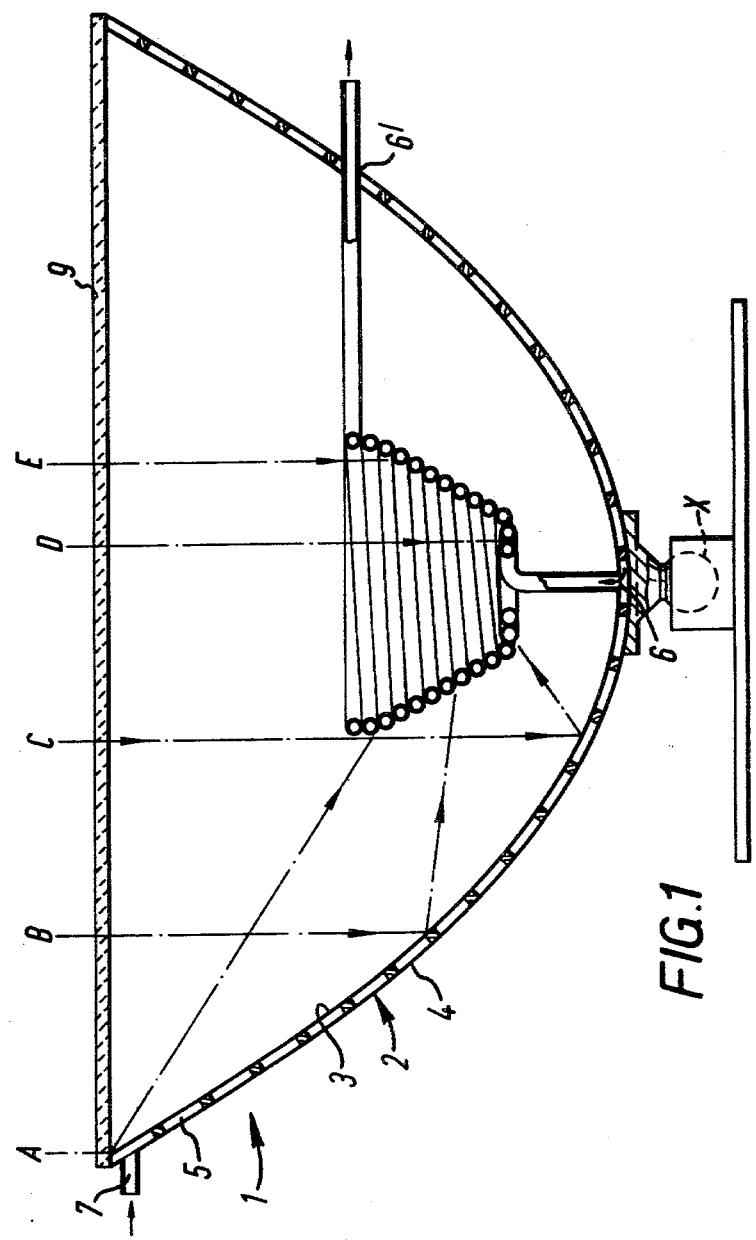
FIG. 1 is a diagrammatic representation of solar energy heating apparatus in accordance with the present invention.

Referring now to FIG. 1 of the drawings, a solar energy heating apparatus 1 comprises a paraboloidal dish 2 having an inner concave solar energy reflecting surface 3 and an outer convex surface 4. The dish 2 is provided with a conduit 5 extending between the surfaces 3 and 4 and which, in plan, has a spiral configuration, an upper end portion of the conduit 5 being adjacent a rim of the dish 2 and an opposite lower end portion of the conduit terminating in an aperture 6 in the centre of the concave surface 3. The upper end portion of the conduit is in communication with an inlet 7 extending radially outwardly of the dish 2.

The dish 2 has located above the aperture 6 of the reflecting surface 3 an evaporator comprising a tube wound to form a helix of hollow frusto-conical longitudinal cross-section, which tapers downwardly to a flattened lower end portion of reduced diameter. Adjacent portions of turns of the helix may be in contact one with another. A lower end of the tube forming the helix is secured to the concave surface 3 of the dish 2 and is in communication with the conduit 5 through the aperture 6 and an upper end portion of the tube extends radially of the dish 2 through an aperture 6′ in the dish 2. The tube may be made of black synthetic rubber such as the rubber marketed under the Registered Trade Mark "Viton A". The dish 2 has secured to a periphery thereof a glass panel 9 thereby enclosing a space bounded by the reflecting surface 3. The outer surface 4 of the dish 2 preferably is coloured black and is surrounded by lagging (not shown) preferably made of expanded polystyrene.

The dish 2 may be formed of two concentric skins of a material suitable for adhering to or accepting a reflective surface, the skins being separated by an elongate gasket coiled to form a spiral configuration when the dish 2 is viewed in plan, the adjacent turns of the coiled gasket being spaced to provide the conduit 5.

In use, water is supplied through the inlet 7 and passes into the conduit 5. Solar energy incident on the reflecting surface 3 is represented by the rays A, B, C, D and E, the rays extending parallel to one another and normal to the glass panel 9. The rays A, B and C strike the reflecting surface 3 and are directed towards the focal point of the paraboloidal surface 3. However, not all of the total energy is reflected at the surface 3, and the proportion of the incident energy absorbed by the surface 3 raises the temperature of the surface, with the result that the water in the conduit 5 is heated also. The preheated water in the conduit 5 thereafter enters the tube forming the evaporator 8.

The rays reflected at the surface 3 do not reach the focal point because they are intercepted by the outer surface of the evaporator 8 and are concentrated at that surface and the solar energy incident thereon from the reflected surface 3 is absorbed by the evaporator 8 generating heat thereby raising the temperature of the preheated water supplied to the evaporator 8 from the conduit 5, thus effecting evaporation of the water in the evaporator. The rays D and E impinge upon the inner surface of the evaporator 8 and similarly heat the preheated water in the evaporator.

Preferably, the surface area of the reflecting surface 3 and the surface area of the outer surface of the evaporator 8 is such that the amplification of the solar energy incident on the reflecting surface 3 compared with the solar energy incident on the outer surface of the evaporator 8 reflected from the reflecting surface 3 is 4:1, as illustrated diagrammatically between the rays A and B.

The glass panel 9 eliminates force draught feeding within the space bounded by the reflecting surface 3 and enclosed by the glass panel. The enclosed space is thus maintained at a high temperature and it is insulated from outside effects such as ambient temperature.

It will be appreciated, therefore, that with the solar energy heating apparatus 1 heat losses due to absorption of solar energy incident on the reflecting surface 3 are reduced to a minimum and full advantage is taken of the infra-red radiation incident on the glass panel 9. Furthermore, since the evaporator 8 is formed of a tube wound to form a helix of hollow frusto-conical shape with adjacent portions of turns of the helix in contact with one another, the inner and outer surfaces of the conical shape are corrugated thereby providing 50% greater heating surface than would be the case if the surface areas of the inner and outer surfaces of the evaporator had not been increased by the corrugations.

The heating apparatus may be supported on a ball joint and clamp X so that the apparatus may be moved to track the sun.

Figure 2:
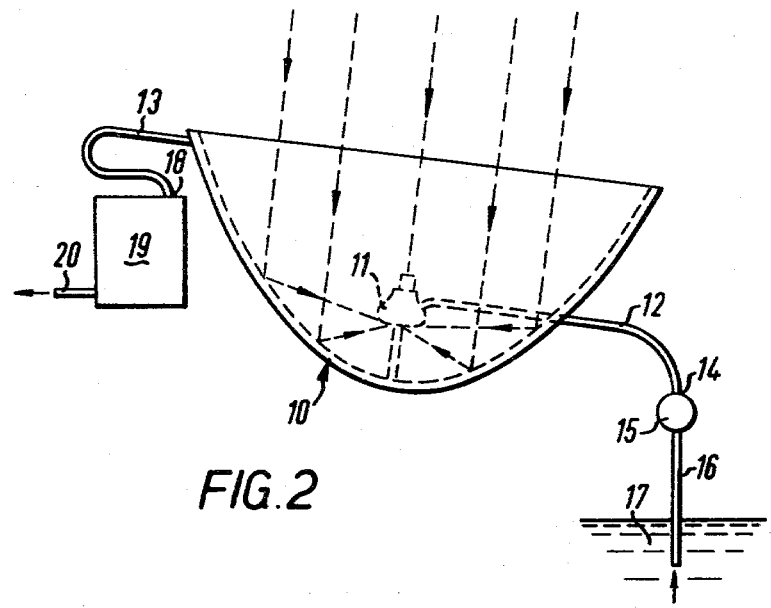
FIG. 2 is a diagrammatic representation of the heating apparatus shown in FIG. 1 adapted for desalinating brine.

Referring now to FIG. 2 of the drawings, a paraboloidal heating apparatus similar to the device 1, shown diagrammatically at 10, is adapted for use as a desalination plant. The apparatus 10 includes an evaporator 11 having an inlet supply pipe 12 and an outlet pipe 13. The inlet supply pipe 12 is connected to an outlet 14 of a pump 15. The pump 15 has an inlet supply pipe 16 suitable for insertion into brine 17. The outlet pipe 13 of the evaporator 11 is connected to an inlet 18 of a condenser 19 having an outlet 20.

In operation, a portion of the inlet supply pipe 16 of the pump 15 is inserted into the brine 17 and the pump is operated to draw the brine through the inlet supply pipe 16 to the pump and to feed the brine from the pump to the evaporator 11. The brine is then evaporated by the solar energy concentrated at the evaporator 11 with a result that the water vapour or steam is driven off while the salt remains in solution in the evaporator. The steam passes through the outlet pipe 13 to the condenser 19 where it is condensed and leaves the condenser through the outlet 20 as purified water.

Figure 3:
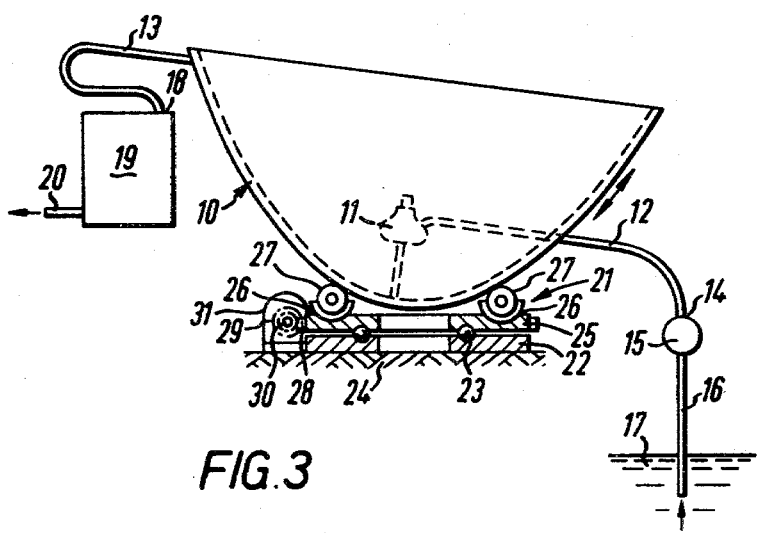
FIG. 3 is a diagrammatic representation of an embodiment for moving the heating apparatus shown in FIG. 2.

Referring now to FIG. 3 of the drawings, the heating appartus 10 is supported on a movable support generally designated 21. The movable support comprises a lower circular plate 22, an upper surface of which is adapted to receive a ball race 23 and a lower surface of which is secured to a fixed support 24; an upper circular plate 25 having a lower surface adapted to be received on the ball race 23 so as to be rotatable relative to the lower circular plate 22 and having an upper surface provided with recesses 26 containing spherical members 27. The heating apparatus 10 is supported on the spherical members 27.

The upper circular plate 25 has a circumferential gear 28. The gear 28 engages a worm 29 secured to a shaft 30. The shaft 30 is turned by a control mechanism 31 so that the upper circular plate 25 and thus the heating apparatus 10 turns in accordance with the diurnal motion of the Earth relative to the Sun. A further mechanism (not shown) also controlled by the control mechanism effects movement of the heating apparatus 10 relative to the upper circular plate 25 so that the reflector surface can be adjusted in accordance with the declination of the Sun relative to the position of the fixed support 24.

Figure 4:
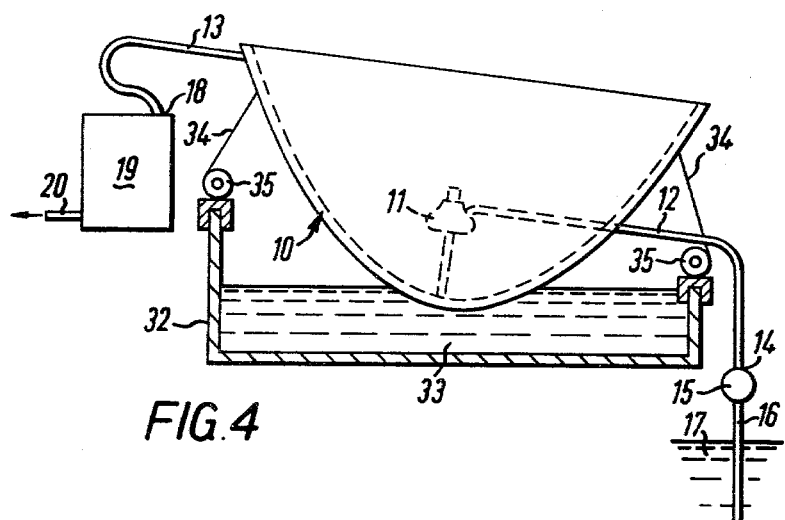
FIG. 4 is a diagrammatic representation of another embodiment for moving the apparatus shown in FIG. 2.

Referring now to the embodiment shown in FIG. 4 of the drawings, there is provided a tank 32 containing liquid 33. The heating apparatus 10 is arranged to float on the liquid 33 and is located relative to the tank 32 by means of straps 34. The straps 34 are adjustable in length by means of adjusting devices 35 mounted on the tank 33. By operating the adjusting devices 35 the length of the straps 34 can be adjusted so that the position of the heating apparatus 10 can be set in accordance with a desired angle of declination. Further straps (not shown) are provided for moving the heating apparatus 10 in accordance with the diurnal motion of the Earth relative to the Sun.

The tank 32 may be arranged to float on the brine 17. Alternatively, the tank 32 may be mounted on a support (not shown).

Figure 5:
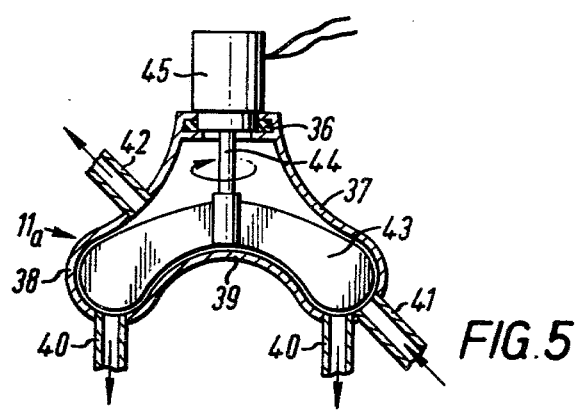
FIG. 5 is a diagrammatic representation of an evaporator for a heating apparatus in accordance with the present invention.

Referring now to FIG. 5 of the drawings, there is shown an evaporator 11a which may be substituted for the evaporator 11. The evaporator 11a is generally circular in plan and has an upper generally cylindrical portion 36, a downwardly extending intermediate portion 37 of increasing cross-section and a bulbous lower portion 38, which lower portion has an inwardly re-entrant part-spherical base 39 to form an evaporation chamber having a bi-lobal pipe 12 is connected to an outlet 14 of a pump 15. The pump 15 has an inlet supply pipe 16 suitable for insertion into brine 17. The outlet pipe 13 of the evaporator 11 is connected to an inlet 18 of a condenser 19 having an outlet 20.

In operation, a portion of the inlet supply pipe 16 of the pump 15 is inserted into the brine 17 and the pump is operated to draw the brine through the inlet supply pipe 16 to the pump and to feed the brine from the pump to the evaporator 11. The brine is then evaporated by the solar energy concentrated at the evaporator 11 with a result that the water vapour or steam is driven off while the salt remains in solution in the evaporator. The steam passes through the outlet pipe 13 to the condenser 19 where it is condensed and leaves the condenser through the outlet 20 as purified water.

Referring now to FIG. 3 of the drawings, the heating apparatus 10 is supported on a movable support generally designated 21. The movable support comprises a lower circular plate 22, an upper surface of which is adapted to receive a ball race 23 and a lower surface of which is secured to a pipe 12 is connected to an outlet 14 of a pump 15. The pump 15 has an inlet supply pipe 16 suitable for insertion into brine 17. The outlet pipe 13 of the evaporator 11 is connected to an inlet 18 of a condenser 19 having an outlet 20.

In operation, a portion of the inlet supply pipe 16 of the pump 15 is inserted into the brine 17 and the pump is operated to draw the brine through the inlet supply pipe 16 to the pump and to feed the brine from the pump to the evaporator 11. The brine is then evaporated by the solar energy concentrated at the evaporator 11 with a result that the water vapour or steam is driven off while the salt remains in solution in the evaporator. The steam passes through the outlet pipe 13 to the condenser 19 where it is condensed and leaves the condenser through the outlet 20 as purified water.

Referring now to FIG. 3 of the drawings, the heating apparatus 10 is supported on a movable support generally designated 21. The movable support comprises a lower circular plate 22, an upper surface of which is adapted to receive a ball race 23 and a lower surface of which is secured to a vertical section. The bulbous lower section 38 has outlet conduits 40 extending downwardly therefrom for removing concentrated impurities from the evaporator and an inlet conuit 41 extending into a side portion thereof on which an end of the supply pipe 12 is received. The intermediate portion 37 has a radially outwardly projecting outlet conduit 42 which is in communication with the conduit 5 through the aperture 6. The evaporator 11a contains a scraper blade 43 which conforms substantially to the inner cross-sectional shape of the lower portion 38 of the evaporator. The scraper blade 43 is secured to a lower end of a shaft 44 which extends through the cylindrical portion 36 from outside of the evaporator 11a. An upper end of shaft 44 is adapted to be driven by a motor 45.

In operation, the brine 17 is pumped by the pump 15 to the evaporator 11a via the supply pipe 12 and through the inlet conduit 41 and steam leaves the evaporator 11a through the outlet conduits 42. The salt solution from the brine 17 collects in the evaporator 11a. By operating the motor 45, the scraper blade 43 rotates on the central longitudinal axis of the shaft 44 and moves the salt solution to the outlet conduits 40 so that the salt solution leaves the evaporator 11a by way of the outlet conduits 40 from which the salt solution can be collected.

It will be appreciated that in the embodiments described above with reference to FIGS. 3 and 4, the support 24 for the embodiment illustrated in FIG. 3 or the support for the tank 32 of the embodiment illustrated in FIG. 4, when the tank 32 is not floated on liquid, may be fixed relative to the Earth or may be mounted on a transportable vehicle.

The reflecting surface 3 of each heating apparatus 1 and 10 may be of metal other than spun steel, for example Duraluminium, or plastics material coated with a reflective surface.

It will also be appreciated that the brine 17 may be used as the coolant in the condenser 19. In this manner heat from the condenser 19 warms up the feed stock thereby giving greater thermal gain.

It will also be appreciated that the floatable arrangement of the apparatus shown in FIG. 4 can be towed on water and can thus be moved to suitable locations.

I claim:

1. A solar energy heating apparatus comprising a reflector for concentrating incident solar energy on a surface thereof to an absorption station, said reflector having a conduit arranged along a surface of said reflector for heating a fluid in said conduit;

an absorber located at substantially the absorption station associated with said reflector, said absorber comprising a housing having a cylindrical end facing away from said reflector, the surface of said housing extending outwardly from said end toward said reflector along an outside radius and thence inwardly along a smaller radius and thence outwardly away from said reflector to form first and second bulbous portions, said housing having at least first and second openings for receiving and delivering a fluid from said conduit; and means for connecting said conduit to one of said openings whereby fluid flowing through said absorber and said conduit is heated from the heat generated along said reflector and at said absorption station.

2. Apparatus as claimed in claim 15 wherein the said reflector includes a surface for exposure to the said incident energy and the conduit is associated with said reflector so that fluid directed therethrough is circulated behind substantially the whole of the said surface whereby the fluid is initially preheated by the incident energy absorbed by the said surface.

3. Apparatus as claimed in claim 2 wherein the said surface of the said energy concentrating means is a curved reflecting surface for concentrating solar energy incident thereon at the absorber.

4. Apparatus as claimed in claim 3 wherein the curved reflecting surface is parabolic.

5. Apparatus as claimed in claim 1 wherein the absorber is contained within a space bound by said surface of the said reflector and enclosed by a plate for transmitting solar energy therethrough to said reflector and to the absorber.

* * * * *